March 3, 1942.  P. H. PERÉNYI  2,275,313
STATISTICAL CHART
Filed Aug. 9, 1940  2 Sheets-Sheet 1
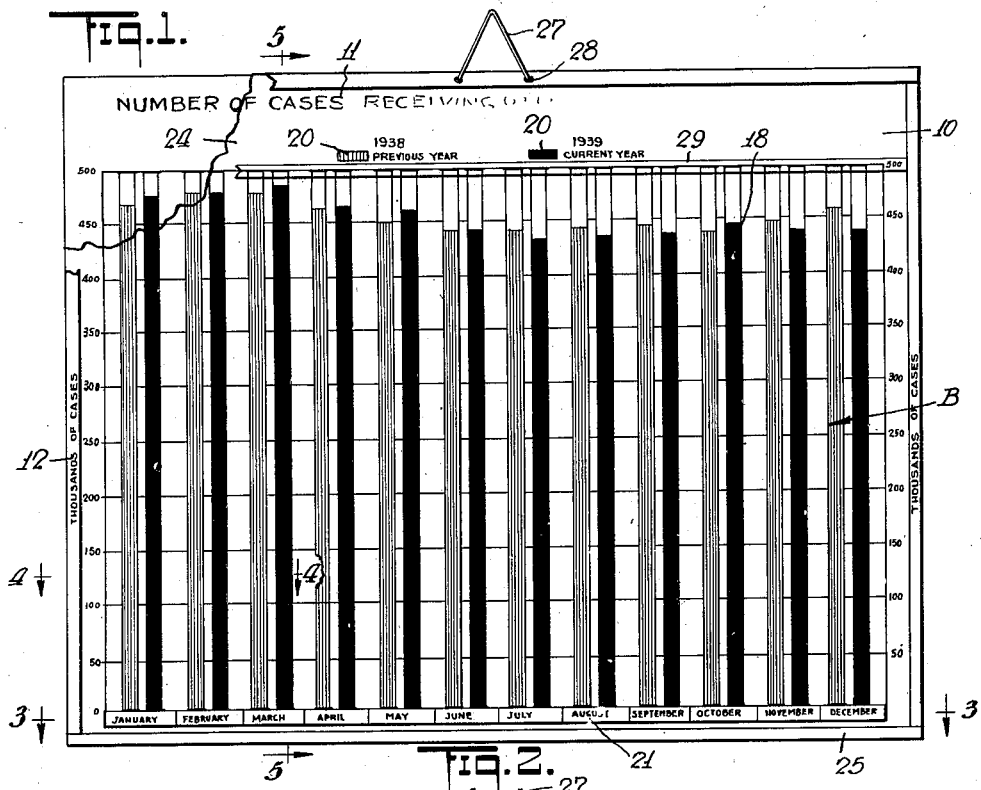
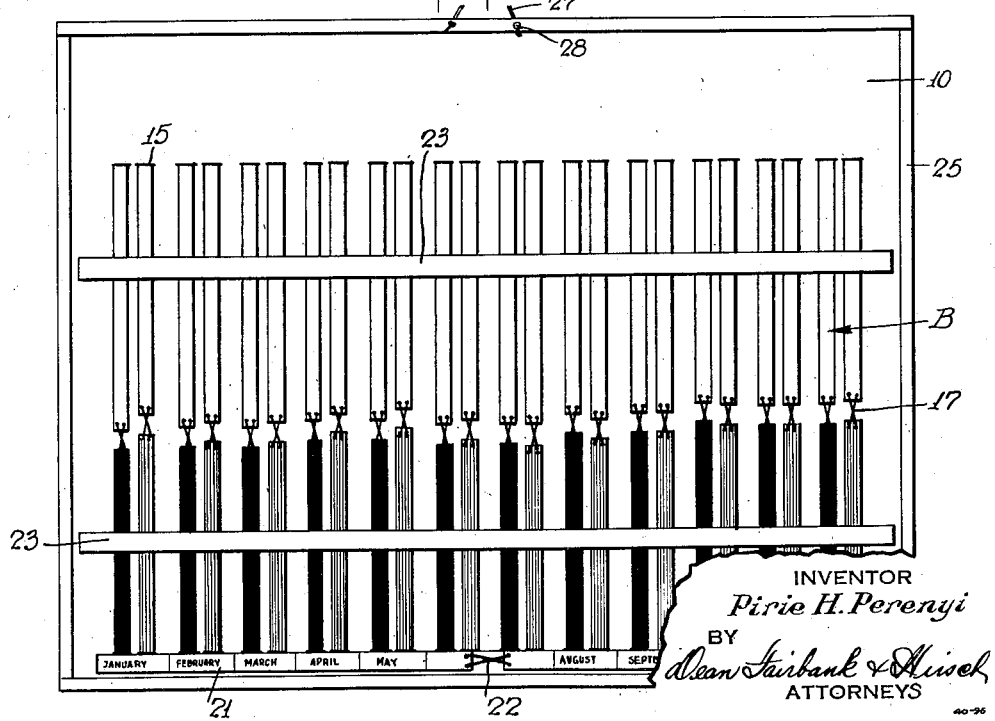
INVENTOR
*Pirie H. Perenyi*
BY
*Dean Fairbank & Hirsch*
ATTORNEYS March 3, 1942.    P. H. PERÉNYI    2,275,313
STATISTICAL CHART
Filed Aug. 9, 1940    2 Sheets-Sheet 2
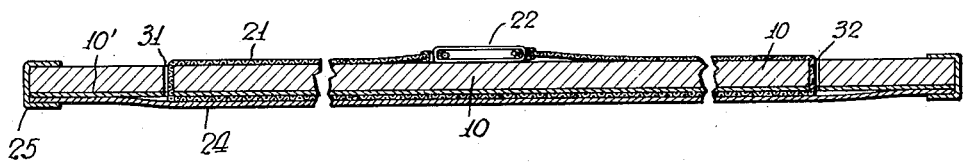
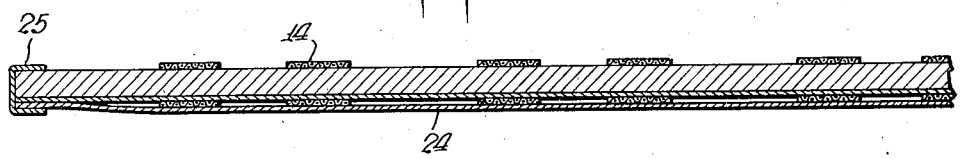
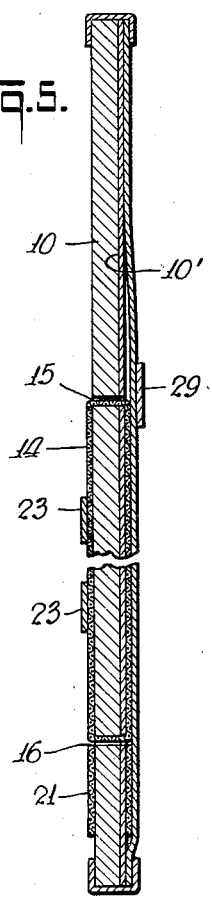
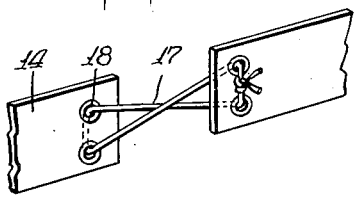
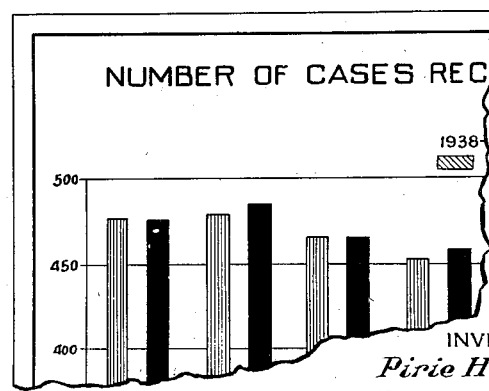
INVENTOR
*Pirie H. Perenyi*
BY
*Dean Fairbank & Hirsch*
ATTORNEYS Patented Mar. 3, 1942

2,275,313

UNITED STATES PATENT OFFICE 2,275,313

STATISTICAL CHART

Pirie H. Perényi, Albany, N. Y., assignor of one-half to Edward T. Frankel, Albany, N. Y.

Application August 9, 1940, Serial No. 351,939

3 Claims. (Cl. 116—135)

The invention is concerned with means for promptly and conveniently keeping up to date statistical charts.

Among the objects of the invention are to provide statistical bar chart equipment made up of inexpensive materials and that they may be readily adjusted to show the desired height of each bar, as well as the label for each bar without the danger of inadvertent shifting or displacement and in such condition as to admit of quick reproduction of such charts for distribution.

As conducive to a clear understanding of the purpose of the invention, it is noted that statistical charts are invaluable that will immediately show trends both qualitatively and quantitatively by enabling one to compare at a glance data for successive units of time in their relation to corresponding data for periods in the past. Time consuming labor and expense involved in drafting such charts and keeping them current have militated against their extensive use heretofore.

To render charts of the type set forth with up to date recordings thereon, quickly available to various organizations and to do so at no great expense is an important object of the present invention.

In the accompanying drawings in which is shown one of various possible embodiments of the several features of the invention, Fig. 1 is a plan view of one embodiment of the chart, Fig. 2 is a rear view thereof, Fig. 3 is a view in transverse cross-section taken on line 3—3 of Fig. 1, Fig. 4 is a view in transverse cross-section taken on line 4—4 of Fig. 1, Fig. 5 is a view in longitudinal cross-section taken on line 5—5 of Fig. 1, Fig. 6 is a perspective view of the connecting detail at the ends of the parallel strips or bands, and Fig. 7 is a fragmentary plan view of one of the charts as reproduced.

The accompanying drawings by way of illustration of only one of multitudinous possible fields of application and use, show an adjustable chart as used in the Bureau of Research and Statistics of the New York State Department of Social Welfare, particularly to show cases receiving public relief in New York for each of the months of 1939 as compared with corresponding data for 1938.

Referring now to the drawings, the chart has a baseboard 10 which may be preferably of rigid material such as wood, composition, plastic or the like, upon the face of which is desirably pasted by any suitable adhesive a facing 10' of suitable paper, upon which are imprinted various indicia such as the title 11 and the designations 12 of the units indicated by bars B. In this embodiment, the bars B illustratively shown for the purpose of the particular embodiment disclosed as twenty-four in number, extend vertically and each comprises a strip 14, preferably of heavy map cloth which is threaded through corresponding horizontal slots 15 and 16 respectively near the upper and lower ends of the baseboard 10 and its facing 10'. The opposite extremities of each strip 14 face each other at the rear of the base board and are desirably connected together under tension as for instance by means of a lace 17 threaded through corresponding eyelets 18 in the ends of the strip. By tensioning the lace 17 sufficiently, the front of the band 14 may be caused to extend snugly against the facing 10', without impairing however the facility of adjusting the position of the band 14 by moving the lace portion upward or downward along the back of the base board. A length of the band of at least the distance between the slots 15 and 16 is colored black as at 18 or any other suitable shade to contrast with the color of the remaining length of said band which is desirably white. The dark or colored length of band may be adjusted to extend from the lower slot 16 to any selected height corresponding to the scale marking to be registered. In the particular embodiment shown, the vertically arranged bands are shown in two sets, one set at the right having markings in black, the set at the left having such markings of different color, illustratively gray. Thus, each pair of bands, as shown illustratively in the legends marking 20, may represent the data for the corresponding month of two consecutive years.

The labels designating the various bars are preferably themselves imprinted upon a label band 21 which extends at right angles to the bar bands, in the present embodiment, horizontally below the lower slots 16 for said bands, and across the entire width of charts occupied by the parallel bands. The horizontal strip or band like the vertical bands, is formed from a strip 21 which extends through slots 31 and 32 on the base board 10 and its facing 10'. The ends of strip 21 are desirably laced together as shown at 22. Imprinted upon the horizontal band are the successive designations which extend however through substantially two complete sequences. In the embodiment shown, where consecutive months of the year are indicated, the label designations would be for twenty-three consecutive months, so that a sequence of twelve consecutive months beginning with any month of the year, could be exposed at the front of the chart by appropriate setting of said band, to correspond with the showing desired.

Desirably, adhesive tape 23 of the stripping type is applied over the rear face or the back of the board across the various bands thereon to retain the latter against inadvertent displacement from their respective settings.

It will immediately be apparent that as soon as up to date statistics are available, the chart may be readily set up in a matter of a few minutes to represent such showing in a single informative chart and in association with the antecedent data.

Desirably the chart is covered with a window facing 24 Celluloid or other transparent material which may be attached to the backing frame by borders 25 of stripping adhesive tape. The chart may be hung by a piece of strong twine 27 secured at a pair of holes 28 near the upper rim thereof.

The chart in adjusted condition set forth, may be readily reproduced by any photographic process as by photostating, and the chart as thus reproduced gives no indication that it had been prepared by simple adjustment of bands.

Labels 20 for the years for instance, shown as part of the key may be imprinted on small rectangles of the same strong paper as that used for the chart and releasably affixed to the base board with rubber cement, so that they may be replaced as required, and will be reproduced in all cases, as if directly imprinted upon the sheet.

In the chart, the slots 15 at the top, which ordinarily are immediately above white portions of the bars, would reproduce as black dashes. These may be readily concealed by applying a narrow strip of white opaque adhesive tape 29 across the width of the chart for said slots. Such tape is not needed at the bottom slots 16 which merge with the dark exposed lower ends of each bar.

It will be immediately seen that for modifying a chart to incorporate the date of the currently completed time interval, it is merely necessary to advance the horizontal or label part through one interval to apply the setting of the currently elapsed period to the last of the vertical bars and to set the other bars to correspond with the data for the various labels. The master chart as thus set may be hung on the wall as suggested in Fig. 1, and reproductions thereof will have the appearance of specially prepared printed sheets as shown in Fig. 7.

As many changes could be made in the above article and method and many apparently widely different embodiments of this invention could be made without departing from the scope of the claims, it is intended that all matter contained in the above description or shown in the accompanying drawings shall be interpreted as illustrative and not in a limiting sense.

Having thus described my invention, what we claim as new and desire to secure by Letters Patent is:

1. An adjustable statistical chart comprising a rigid base board, a plurality of parallel continuous bands each of length substantially completely to embrace the base board, each of said bands having substantially half of its length of color distinguished from that of the remainder, and a label band extending in the same plane but directed at right angles to that of said plurality of bands and traversing the combined widths of said bands and bearing label designations extending in a predetermined sequence along the width occupied by said plurality of parallel bands, said label band having a repetition of said sequence, the two sequences conjointly extending along substantially the entire length of said label band, whereby the label band may be adjusted to identify the parallel bands by consecutive label designations beginning with any selected label designation.

2. The combination recited in claim 1 in which the plurality of parallel continuous bands are in two sets of contrasting color, each set of two such bands being identified by a single label designation for facility of comparison.

3. A statistical chart comprising a rigid base board, having imprinted matter on the face thereof, a plurality of parallel strips extending through corresponding parallel slots in said base board, and means binding the ends of said strips together to form endless bands, each of said bands having approximately half the length thereof of appearance discriminated from that of the remainder, an endless label band extending at right angles to the length of said various parallel bands, and having sequentially arranged label indications thereon arranged in one complete sequence and in a repetition thereof, said label designations occupying substantially the length of said label band, whereby the label band may be selectively coordinated with the respective parallel bands to begin the sequence with any selected label indication.

PIRIE H. PERÉNYI.